(12) United States Patent
Jiang et al.

(10) Patent No.: US 10,785,785 B2
(45) Date of Patent: Sep. 22, 2020

(54) METHOD AND DEVICE IN UE AND BASE STATION

(71) Applicant: SHANGHAI LANGBO COMMUNICATION TECHNOLOGY COMPANY LIMITED, Shanghai (CN)

(72) Inventors: Qi Jiang, Shanghai (CN); XiaoBo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/412,391

(22) Filed: May 14, 2019

(65) Prior Publication Data

US 2019/0268921 A1 Aug. 29, 2019

Related U.S. Application Data

(63) Continuation of application No. PCT/CN2017/108489, filed on Oct. 31, 2017.

(30) Foreign Application Priority Data

Nov. 16, 2016 (CN) .......................... 2016 1 1022276

(51) Int. Cl.
*H04W 72/12* (2009.01)
*H04L 1/00* (2006.01)
(Continued)

(52) U.S. Cl.
CPC ........... *H04W 72/1257* (2013.01); *H04L 1/00* (2013.01); *H04L 1/0004* (2013.01);
(Continued)

(58) Field of Classification Search
CPC ......... H04W 72/1257; H04W 72/0446; H04W 80/08; H04W 88/06; H04W 88/10;
(Continued)

(56) References Cited

U.S. PATENT DOCUMENTS

2014/0211873 A1    7/2014  Park et al.
2016/0112173 A1*   4/2016  Wang .................... H04L 5/0048
                                                       370/329
(Continued)

FOREIGN PATENT DOCUMENTS

CN    102484520 A    5/2012
CN    102754364 A    10/2012
(Continued)

OTHER PUBLICATIONS

CN2016110222765 1st Search Report dated Sep. 11, 2019.
ISR received in application No. PCT/CN2017/108489 dated Jan. 10, 2018.

*Primary Examiner* — Walli Z Butt
(74) *Attorney, Agent, or Firm* — Maschoff Brennan

(57) ABSTRACT

The disclosure provides a method and a device in a User Equipment (UE) and a base station. The UE receives first configuration information, and then receives a first radio signal and a second radio signal in first and second time domain resources respectively. A first bit block generates the first and second radio signals. The first configuration information is applied to the first and second radio signals, and antenna ports corresponding to the first radio signal are different from antenna ports corresponding to the second radio signal. According to the disclosure, the first configuration information configures both the first and second radio signals, and the first and second radio signals received on different time domain resources respectively; therefore, data corresponding to one same bit block can be transmitted (Continued)

through different modes, air interface resources can be fully utilized and the overall spectrum efficiency of the system can be improved.

20 Claims, 10 Drawing Sheets

(51) Int. Cl.
*H04L 1/18* (2006.01)
*H04W 72/04* (2009.01)
*H04W 80/08* (2009.01)
*H04W 88/06* (2009.01)
*H04W 88/10* (2009.01)

(52) U.S. Cl.
CPC ....... *H04L 1/1819* (2013.01); *H04W 72/0446* (2013.01); *H04W 80/08* (2013.01); *H04W 88/06* (2013.01); *H04W 88/10* (2013.01)

(58) Field of Classification Search
CPC ...... H04W 72/042; H04L 1/00; H04L 1/0004; H04L 1/1819; H04L 1/0075; H04L 1/0025; H04L 1/1887; H04L 1/1896; H04L 1/0027
See application file for complete search history.

(56) References Cited

U.S. PATENT DOCUMENTS

| 2017/0078126 A1* | 3/2017 | Einhaus | H04W 72/042 |
| 2018/0262252 A1* | 9/2018 | Oh | H04B 7/0636 |
| 2019/0109686 A1* | 4/2019 | Jiang | H04L 5/0073 |

FOREIGN PATENT DOCUMENTS

| CN | 105429683 A | 3/2016 |
| CN | 105792359 A | 7/2016 |

* cited by examiner

METHOD AND DEVICE IN UE AND BASE STATION

CROSS-REFERENCE TO RELATED APPLICATION

This application is a continuation of International Application No. PCT/CN2017/108489, filed Oct. 31, 2017, claiming the priority benefit of Chinese Patent Application Serial Number 201611022276.5, filed on Nov. 16, 2016, the full disclosure of which is incorporated herein by reference.

BACKGROUND

Technical Field

The disclosure relates to transmission schemes of radio signals in wireless communication systems, and in particular to a method and a device for low-latency transmission.

Related Art

In conventional wireless communication systems based on digital modulation modes, for example, in 3rd Generation Partner Project (3GPP) cellular systems, transmissions of both uplink and downlink radio signals are based on scheduling of a base station. Further, the transmission at a given time is based on a currently configured Transmission Mode (TM), and one time of transmission of one Transmission Block (TB) can employ one TM only—corresponding to one Downlink Control Information (DCI) format.

In the subject of reduced latency in Release 14, multiple DCIs are introduced for one TB. Multiple DCIs schedule the transmission of one TB simultaneously, so as to reduce latency and reduce overheads of control signalings. However, one TB can still employ one TM only.

New Radio (NR) access technologies are being discussed in the 3GPP. Typical application scenarios include Massive MIMO, etc. In view of the massive MIMO, Beamforming (BF) and beam sweeping based transmission modes will be broadly applied. However, for one Radio Frequency (RF) chain, multiple analog beams generated can be Time Division Multiplexing (TDM) only. When transmitting Reference Signals (RSs) based on beam sweeping, whether data can be multiplexed is a problem to be resolved.

SUMMARY

In view of the above problems, the disclosure provides a solution. It should be noted that the embodiments of the disclosure and the characteristics in the embodiments may be mutually combined if no conflict is incurred. For example, the embodiments of the UE of the disclosure and the characteristics in the embodiments may be applied to the base station, and vice versa. It should be further noted that although the disclosure is originally designed in view of scenarios of multi-antenna transmission, the disclosure is also applicable to scenarios of single-antenna transmission, for example, short latency communications, Ultra Reliable Low Latency Communication (URLLC), etc.

The disclosure provides a method in a User Equipment (UE) for dynamic scheduling, wherein the method includes:
receiving first configuration information; and
receiving a first radio signal and a second radio signal in first time domain resources and second time domain resources respectively.

Herein, a first bit block is used for generating the first radio signal and the second radio signal; the first configuration information is applied to the first radio signal and the second radio signal, and the first configuration information includes at least one of a Modulation and Coding Status (MCS), a Hybrid Automatic Repeat request (HARQ) process number, a New Data Indicator (NDI), or a Redundancy Version (RV); the first radio signal is transmitted by a first antenna port group, and the second radio signal is transmitted by a second antenna port group; the first antenna port group and the second antenna port group include P1 antenna port(s) and P2 antenna port(s) respectively; the P1 and the P2 are positive integers respectively; and at least one of the antenna ports belongs to one of the first antenna port group or the second antenna port group only (that is to say, the antenna ports in the first antenna port group and the antenna ports in the second antenna port group are not entirely identical).

In one embodiment, an antenna virtualization vector, used for generating an analog beam, corresponding to all antenna ports in the first antenna port group is a first vector, and an antenna virtualization vector, used for generating an analog beam, corresponding to all antenna ports in the second antenna port group is a second vector.

In the above embodiment, one time of transmission of the first bit block can correspond to two analog beam directions. The compatibility is better and the transmission efficiency is improved.

In one embodiment, a transmission mode corresponding to the first radio signal is transmit diversity, and a transmission mode corresponding to the second radio signal is beamforming.

When the first time domain resources can be used for the transmission mode of transmit diversity only while the second time domain resources can be used for the transmission mode of beamforming, the above embodiment can make full use of time domain resources and transmit data in time. However, in conventional LTE, one time of transmission of the first bit block can employ one transmission mode only, and cannot occupy the first time domain resources and the second time domain resources simultaneously, thus reducing transmission efficiency or increasing transmission latency.

In one embodiment, the above method is further characterized in that: the first time domain resources carry out beam sweeping based transmissions; when the beam direction in the first time domain resources aligns to the UE, one time of transmission of the first bit block can be carried out on the first time domain resources.

In one embodiment, the first bit block is a TB.

In one embodiment, the first bit block includes multiples bits.

In one embodiment, the first configuration information further includes occupied frequency domain resources.

In one embodiment, the first radio signal employs a transmission mode of transmit diversity, and the second radio signal employs a transmission mode of beamforming.

In one embodiment, the first radio signal employs a transmission mode of sweeping, and the second radio signal employs a transmission mode of beamforming.

In one embodiment, any two of the antenna ports in the first antenna port group are allocated with time domain resources which are orthogonal.

In one embodiment, there is a given time, and the given time is allocated to all of the antenna ports in the second antenna port group.

In one embodiment, the first configuration information is used for determining at least one of the first antenna port group or the second antenna port group.

In one subembodiment, the first configuration information indicates at least one of an index corresponding to the first antenna port group or an index corresponding to the second antenna port group.

In one embodiment, none of the antenna ports in the first antenna port group belongs to the second antenna port group.

In one embodiment, partial of the antenna ports in the first antenna port group do not belong to the second antenna port group, and partial of the antenna ports in the first antenna port group belong to the second antenna port group.

In one embodiment, the TM employed by the first radio signal is different from the TM employed by the second radio signal.

In one embodiment, the first configuration information corresponds to one or more DCIs.

In one embodiment, the first configuration information is carried by a physical-layer signaling.

In one embodiment, the P1 is different from the P2.

In one embodiment, the first time domain resources and the second time domain resources comprise a positive integer number of multicarrier symbols respectively.

In one subembodiment, the multicarrier symbol is one of an Orthogonal Frequency Division Multiplexing (OFDM) symbol, a Single-Carrier Frequency Division Multiple Access (SC-FDMA) symbol, a Filter Bank Multi Carrier (FBMC) symbol, an OFDM symbol including a Cyclic Prefix (CP) or a Discrete Fourier Transform-Spreading-OFDM (DFT-s-OFDM) symbol including a CP.

In one embodiment, the first time domain resources and the second time domain resources are orthogonal.

In one subembodiment, the phase that the first time domain resources and the second time domain resources are orthogonal refers that: no multicarrier symbol belongs to both the first time domain resources and the second time domain resources.

In one embodiment, the phase that the first bit block is used for generating a given radio signal refers that: the given radio signal is (a partial or entirety of) an output after the first bit block is processed sequentially through Channel Coding, Modulation Mapper, Layer Mapper, Precoding, Resource Element Mapper, and Generation of Multicarrier Signals.

In one embodiment, the antenna port is formed by a positive integer number of antennas through antenna virtualization.

According to one aspect of the disclosure, the above method includes:

receiving a first signaling; and receiving a second signaling.

Herein, the first signaling is used for determining at least the former one of a first time domain resource pool or the first antenna port group; the second signaling is used for determining at least the former one of a first time window or the second antenna port group; and the first time domain resources belong to an overlapped part of the first time domain resource pool and the first time window.

In one embodiment, the second time domain resources belong to the first time window.

In one embodiment, the second signaling indicates the first time domain resources from the overlapped part of the first time domain resource pool and the first time window.

In the above embodiment, the second signaling can select appropriate time domain resources (beam directions) for the UE according to channel characteristics of the UE, on one hand the reception quality of the first radio signal is improved, on the other hand the base station can allocate time domain resources (beam directions) in the overlapped part of the first time domain resource pool and the first time window which are not appropriate for the UE to other terminals, thus improving transmission efficiency.

In one embodiment, the first signaling is a high-layer signaling, and the second signaling is a physical-layer signaling.

In one embodiment, the first signaling is cell specific or UE group specific, and the second signaling is UE specific. The UE group includes multiple UEs, and the UE is one UE in the UE group.

In one embodiment, the first signaling and the second signaling are both physical-layer signalings.

In one subembodiment, a Cyclic Redundancy Check (CRC) of the first signaling is scrambled with a cell specific Radio Network Temporary Identifier (RNTI) or a UE group specific RNTI.

In one affiliated embodiment of the above subembodiment, RNTIs other than the UE specific RNTI are a System Information RNTI (SI-RNTI).

In one affiliated embodiment of the above subembodiment, RNTIs other than the UE specific RNTI are a UE group specific RNTI.

In one subembodiment, a CRC of the second signaling is scrambled with a UE specific RNTI.

In one affiliated embodiment of the above subembodiment, the UE specific RNTI is a Cell RNTI (C-RNTI).

In one affiliated embodiment of the above subembodiment, the UE specific RNTI is a Transmission Reception Point RNTI (TRP-RNTI).

In one subembodiment, the first configuration is transmitted in one of the first signaling or the second signaling.

In one embodiment, the first signaling is a high-layer signaling, the second signaling is a physical-layer signaling, and the first configuration information is transmitted in the second signaling.

In one embodiment, the first time domain resources occupy partial time domain resources in a second time window, or the first time domain resources occupy all time domain resources in a second time window. The second time window is an overlapped part of the first time domain resource pool and the first time window.

In one embodiment, the second time domain resources belong to the first time window.

In one subembodiment of the above two embodiments, the second time domain resources occupy all time domain resources in the first time window other than the second time window.

In another subembodiment of the above two embodiments, the first signaling is used for determining the first time domain resources from the second time window.

In one affiliated embodiment of the above subembodiment, the first signaling indicates the time domain positions of the first time domain resources in the second time window.

According to one aspect of the disclosure, the above method is characterized in that: the first radio signal includes P1 Reference Signal (RS) port(s), and the P1 RS port(s) is(are) transmitted by the P1 antenna port(s) respectively; and the second radio signal includes P2 RS port(s), and the P2 RS port(s) is(are) transmitted by the P2 antenna port(s) respectively.

In one embodiment, the first radio signal includes a first data, and the second radio signal includes a second data. The first bit block is used for determining the first data and the second data.

In one embodiment, a pattern of the RS ports in a subframe reuses a pattern of Demodulation Reference Signal (DMRS) ports in a subframe.

In one subembodiment, the RS port includes at least one of a Zadoff-Chu sequence or a pseudorandom sequence.

In one subembodiment, any two of the RS ports occupy air interface resources which are orthogonal (that is to say, there is no air interface resource that is occupied by any two of the RS ports simultaneously). The air interface resource includes at least one of time domain resources, frequency domain resources or code domain resources.

In one embodiment, the P2 is greater than the P1.

In one embodiment, the RS port(s) among the P2 RS port(s) is(are) DMRS port(s).

In one embodiment, the RS port(s) among the P1 RS port(s) is(are) Channel State Information Reference Signal (CSI-RS) port(s).

In one embodiment, the RS port(s) among the P1 RS port(s) is(are) CSI-RS port(s), and the RS pot(s) among the P2 RS port(s) is(are) DMRS port(s).

In one embodiment, any two of the P1 RS ports occupy time domain resources which are orthogonal; there is a given time, and the given time is occupied by all the RS ports among the P2 RS ports.

According to one aspect of the disclosure, the above method includes:

transmitting first information.

Herein, the first information is used for determining P3 antenna port(s), the P3 antenna port(s) is(are) a subset of the P1 antenna port(s), and the P3 is a positive integer less than or equal to the P1.

In one embodiment, the above method has the following benefits: the base station can determine the P1 antenna ports adopted to transmit the first radio signal to the UE, by acquiring an uplink report from the UE.

In one embodiment, measurement(s) for the P1 RS port(s) is(are) used for determining the P3 antenna port(s).

In one embodiment, channel quality(qualities) corresponding to the P3 antenna port(s) is(are) the best P3 channel quality(qualities) among channel quality(qualities) corresponding to the P1 antenna port(s).

In one subembodiment, the channel quality includes at least one of a Reference Signal Received Power (RSRP), a Reference Signal Received Quality (RSRQ), a Received Signal Strength Indicator (RSSI), or a Signal to Interference and Noise Rate (SINR).

According to one aspect of the disclosure, the above method is characterized in that: the first radio signal includes P1 radio sub-signals, the P1 radio sub-signals are transmitted by the P1 antenna ports respectively, the P1 radio sub-signals carry identical information, and any two of the P1 radio sub-signals occupy time domain resources which are orthogonal.

In one embodiment, the above method is characterized in that: information corresponding to the first radio signal is transmitted in different directions through a beam sweeping mode, so as to ensure that the UE receives it correctly.

In one embodiment, the P1 radio sub-signals are transmitted through a beam sweeping mode.

According to one aspect of the disclosure, the above method is characterized in that: the first signaling is a physical-layer signaling, and the first signaling includes K1 information bits; the K1 is a positive integer greater than 1; and the K1 has a value related to a time domain position of the first time window.

In one embodiment, the above method has the following benefits: in order to reduce the complexity of the UE performing blind detections of the first signaling, the number of information bits (that is, payload) carried in the first signaling is related to a time domain position of the first time window. When the first time window is overlapped with the first time domain resource pool, the first bit block corresponds to the first radio signal and the second radio signal simultaneously, and the number of information bits carried in the first signaling is a fixed value. When the first time window is not overlapped with the first time domain resource pool, the first bit block corresponds to one radio signal only, and the number of information bits carried in the first signaling is another fixed value. The UE does not need to perform blind detections of DCIs corresponding to two payloads simultaneously, thus reducing the number of blind detections.

In one embodiment, the phase that the K1 has a value related to a time domain position of the first time window refers that: the first time window is overlapped with the first time domain resource pool in time domain, and the K1 is equal to M1; the first time window is not overlapped with the first time domain resource pool in time domain, and the K1 is equal to M2. The M1 and the M2 are both fixed positive integers, and the M1 is greater than the M2.

In one subembodiment, the first time window is overlapped with the first time domain resource pool in time domain, the M1 is equal to a sum of the M2 and 1, the K1 is equal to the M1, the first signaling includes one bit of information, and the one bit of information indicates that the first radio signal is transmitted on the first time domain resources.

In one subembodiment, the first time window is overlapped with the first time domain resource pool in time domain, the M1 is equal to a sum of the M2 and M3, and the M3 is a positive integer greater than 1. The K1 is equal to the M1, the first signaling includes M3 bits of information, and the M3 bits of information indicate positions of the first time domain resources in M4 candidate time domain resources. The M4 candidate time domain resources belong to a second time window. The second time window is an overlapped part of the first time domain resource pool and the first time window. The M4 is a positive integer not greater than the M3th power of 2.

According to one aspect of the disclosure, the above method is characterized in that: the first signaling is a high-layer signaling, the second signaling is a physical-layer signaling, the second signaling includes K2 information bits; the K2 is a positive integer greater than 1; and the K2 has a value related to a time domain position of the first time window.

In one embodiment, the above method has the following benefits: in order to reduce the complexity of the UE performing blind detections of the second signaling, the number of information bits (that is, payload) carried in the second signaling is related to a time domain position of the first time window. When the first time window is overlapped with the first time domain resource pool, the first bit block corresponds to the first radio signal and the second radio signal simultaneously, and the number of information bits carried in the second signaling is a fixed value. When the first time window is not overlapped with the first time domain resource pool, the first bit block corresponds to one radio signal only, and the number of information bits carried in the second signaling is another fixed value. The UE does not need to perform blind detections of DCIs corresponding to two payloads simultaneously, thus reducing the number of blind detections.

In one embodiment, the phase that the K2 has a value related to a time domain position of the first time window refers that: the first time window is overlapped with the first time domain resource pool in time domain, and the K2 is equal to N1; the first time window is not overlapped with the first time domain resource pool in time domain, and the K2 is equal to N2. The N1 and the N2 are both fixed positive integers, and the N1 is greater than the N2.

In one subembodiment, the first time window is overlapped with the first time domain resource pool in time domain, the N1 is equal to a sum of the N2 and 1, the K2 is equal to the N1, the second signaling includes one bit of information, and the one bit of information indicates that the first radio signal is transmitted on the first time domain resources.

In one subembodiment, the first time window is overlapped with the first time domain resource pool in time domain, the N1 is equal to a sum of the N2 and N3, and the N3 is a positive integer greater than 1. The K2 is equal to the N1, the second signaling includes N3 bits of information, and the N3 bits of information indicate positions of the first time domain resources in N4 candidate time domain resources. The N4 candidate time domain resources belong to a second time window. The second time window is an overlapped part of the first time domain resource pool and the first time window. The N4 is a positive integer not greater than the M3th power of 2.

The disclosure provides a method in a base station for dynamic scheduling, wherein the method includes:
transmitting first configuration information; and
transmitting a first radio signal and a second radio signal in first time domain resources and second time domain resources respectively.

Herein, a first bit block is used for generating the first radio signal and the second radio signal; the first configuration information is applied to the first radio signal and the second radio signal, and the first configuration information includes at least one of an MCS, a HARQ process number, an NDI or an RV; the first radio signal is transmitted by a first antenna port group, and the second radio signal is transmitted by a second antenna port group; the first antenna port group and the second antenna port group include P1 antenna port(s) and P2 antenna port(s) respectively; the P1 and the P2 are positive integers respectively; and at least one of the antenna ports belongs to one of the first antenna port group or the second antenna port group only.

According to one aspect of the disclosure, the above method includes:
transmitting a first signaling; and
transmitting a second signaling.

Herein, the first signaling is used for determining at least the former one of a first time domain resource pool or the first antenna port group; the second signaling is used for determining at least the former one of a first time window or the second antenna port group; and the first time domain resources belong to an overlapped part of the first time domain resource pool and the first time window.

According to one aspect of the disclosure, the above method is characterized in that: the first radio signal includes P1 RS port(s), the P1 RS port(s) is(are) transmitted by the P1 antenna port(s) respectively, the second radio signal includes P2 RS port(s), and the P2 RS port(s) is(are) transmitted by the P2 antenna port(s) respectively.

According to one aspect of the disclosure, the above method includes:
receiving first information.

Herein, the first information is used for determining P3 antenna port(s), the P3 antenna port(s) is(are) a subset of the P1 antenna port(s), and the P3 is a positive integer less than or equal to the P1.

According to one aspect of the disclosure, the above method is characterized in that: the first radio signal includes P1 radio sub-signals, the P1 radio sub-signals are transmitted by the P1 antenna ports respectively, the P1 radio sub-signals carry identical information, and any two of the P1 radio sub-signals occupy time domain resources which are orthogonal.

According to one aspect of the disclosure, the above method is characterized in that: the first signaling is a physical-layer signaling, and the first signaling includes K1 information bits; the K1 is a positive integer greater than 1, and the K1 has a value related to a time domain position of the first time window.

According to one aspect of the disclosure, the above method is characterized in that: the first signaling is a high-layer signaling, the second signaling is a physical-layer signaling, and the second signaling includes K2 information bits; the K2 is a positive integer greater than 1; and the K2 has a value related to a time domain position of the first time window.

The disclosure provides a UE for dynamic scheduling, wherein the UE includes:
a first processor, to receive first configuration information; and
a first receiver, to receive a first radio signal and a second radio signal in first time domain resources and second time domain resources respectively.

Herein, a first bit block is used for generating the first radio signal and the second radio signal; the first configuration information is applied to the first radio signal and the second radio signal, and the first configuration information includes at least one of an MCS, a HARQ process number, an NDI or an RV; the first radio signal is transmitted by a first antenna port group, and the second radio signal is transmitted by a second antenna port group; the first antenna port group and the second antenna port group include P1 antenna port(s) and P2 antenna port(s) respectively; the P1 and the P2 are positive integers respectively; and at least one of the antenna ports belongs to one of the first antenna port group or the second antenna port group only.

In one embodiment, the above UE for dynamic scheduling is characterized in that: the first processor further receives a first signaling and a second signaling; the first signaling is used for determining at least the former one of a first time domain resource pool or the first antenna port group; the second signaling is used for determining at least the former one of a first time window or the second antenna port group; and the first time domain resources belong to an overlapped part of the first time domain resource pool and the first time window.

In one embodiment, the above UE for dynamic scheduling is characterized in that: the first processor further transmits first information; the first information is used for determining P3 antenna port(s), the P3 antenna port(s) is(are) a subset of the P1 antenna port(s), and the P3 is a positive integer less than or equal to the P1.

In one embodiment, the above UE for dynamic scheduling is characterized in that: the first radio signal includes P1 RS port(s), and the P1 RS port(s) is(are) transmitted by the P1 antenna port(s) respectively; and the second radio signal includes P2 RS port(s), and the P2 RS port(s) is(are) transmitted by the P2 antenna port(s) respectively.

In one embodiment, the above UE for dynamic scheduling is characterized in that: the first radio signal includes P1 radio sub-signals, the P1 radio sub-signals are transmitted by the P1 antenna ports respectively, the P1 radio sub-signals carry identical information, and any two of the P1 radio sub-signals occupy time domain resources which are orthogonal.

In one embodiment, the above UE for dynamic scheduling is characterized in that: the first signaling is a physical-layer signaling, the first signaling includes K1 information bits, the K1 is a positive integer greater than 1, and the K1 has a value related to a time domain position of the first time window.

In one embodiment, the above UE for dynamic scheduling is characterized in that: the first signaling is a high-layer signaling, the second signaling is a physical-layer signaling, and the second signaling includes K2 information bits; the K2 is a positive integer greater than 1; and the K2 has a value related to a time domain position of the first time window.

The disclosure provides a base station for dynamic scheduling, wherein the base station includes:

a second processor, to transmit first configuration information; and a first transmitter, to transmit a first radio signal and a second radio signal in first time domain resources and second time domain resources respectively.

Herein, a first bit block is used for generating the first radio signal and the second radio signal; the first configuration information is applied to the first radio signal and the second radio signal, and the first configuration information includes at least one of an MCS, a HARQ process number, an NDI or an RV; the first radio signal is transmitted by a first antenna port group, and the second radio signal is transmitted by a second antenna port group; the first antenna port group and the second antenna port group include P1 antenna port(s) and P2 antenna port(s) respectively; the P1 and the P2 are positive integers respectively; and at least one of the antenna ports belongs to one of the first antenna port group or the second antenna port group only.

In one embodiment, the base station for dynamic scheduling is characterized in that: the second processor further transmits a first signaling and a second signaling; the first signaling is used for determining at least the former one of a first time domain resource pool or the first antenna port group; the second signaling is used for determining at least the former one of a first time window or the second antenna port group; and the first time domain resources belong to an overlapped part of the first time domain resource pool and the first time window.

In one embodiment, the base station for dynamic scheduling is characterized in that: the second processor further receives first information; the first information is used for determining P3 antenna port(s), the P3 antenna port(s) is(are) a subset of the P1 antenna port(s), and the P3 is a positive integer less than or equal to the P1.

In one embodiment, the base station for dynamic scheduling is characterized in that: the first radio signal includes P1 RS port(s), and the P1 RS port(s) is(are) transmitted by the P1 antenna port(s) respectively; the second radio signal includes P2 RS port(s), and the P2 RS port(s) is(are) transmitted by the P2 antenna port(s) respectively.

In one embodiment, the base station for dynamic scheduling is characterized in that: the first radio signal includes P1 radio sub-signals, the P1 radio sub-signals are transmitted by the P1 antenna ports respectively, the P1 radio sub-signals carry identical information, and any two of the P1 radio sub-signals occupy time domain resources which are orthogonal.

In one embodiment, the base station for dynamic scheduling is characterized in that: the first signaling is a physical-layer signaling, and the first signaling includes K1 information bits; the K1 is a positive integer greater than 1; and the K1 has a value related to a time domain position of the first time window.

In one embodiment, the base station for dynamic scheduling is characterized in that: the first signaling is a high-layer signaling, the second signaling is a physical-layer signaling, and the second signaling includes K2 information bits; the K2 is a positive integer greater than 1; and the K2 has a value related to a time domain position of the first time window.

Compared with the prior art, the disclosure has the following technical advantages.

Through the design of splitting the information corresponding to the first bit block into the first radio signal and the second radio signal which are transmitted respectively, different transmission modes can be employed for the data of one TB, thus the spectrum utilization in 5G systems is improved and the overall performance is improved.

Through the design of the first signaling and the second signaling, which are used for determining the first time domain resource pool and the time domain position of the first time window respectively, separate transmissions of the first radio signal and the second radio signal become possible.

Through the design of the first information, the first antenna port group corresponding to the first radio signal is determined.

Through the design of establishing a relationship between the number of information bits included in the first signaling and the time domain position of the first time window, the number of blind detections is reduced, and the implementation complexity of the UE is reduced.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if no conflict is incurred.

Embodiment 1

Figure 1:
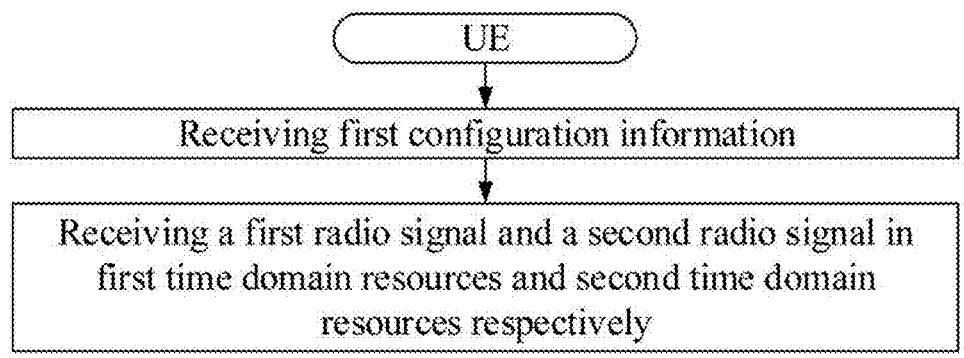
FIG. 1 is a flowchart of first configuration information according to one embodiment of the disclosure.

Embodiment 1 illustrates a flowchart of first configuration information, as shown in FIG. 1.

In Embodiment 1, the UE in the disclosure first receives first configuration information, and then receives a first radio signal and a second radio signal in first time domain resources and second time domain resources respectively; a first bit block is used for generating the first radio signal and the second radio signal; the first configuration information is applied to the first radio signal and the second radio signal, and the first configuration information includes at least one of an MCS, a HARQ process number, an NDI or a RV; the first radio signal is transmitted by a first antenna port group, and the second radio signal is transmitted by a second antenna port group; the first antenna port group and the second antenna port group include P1 antenna port(s) and P2 antenna port(s) respectively; the P1 and the P2 are positive integers respectively; and at least one of the antenna ports belongs to one of the first antenna port group or the second antenna port group only.

In one embodiment, the first bit block is a TB.

In one embodiment, the first bit block includes multiples bits.

In one embodiment, the first configuration information further includes occupied frequency domain resources.

In one embodiment, the first radio signal employs a transmission mode of transmit diversity, and the second radio signal employs a transmission mode of beamforming.

In one embodiment, none of the antenna ports in the first antenna port group belongs to the second antenna port group.

In one embodiment, partial of the antenna ports in the first antenna port group do not belong to the second antenna port group, and partial of the antenna ports in the first antenna port group belong to the second antenna port group.

In one embodiment, the TM employed by the first radio signal is different from the TM employed by the second radio signal.

Embodiment 2

Figure 2:
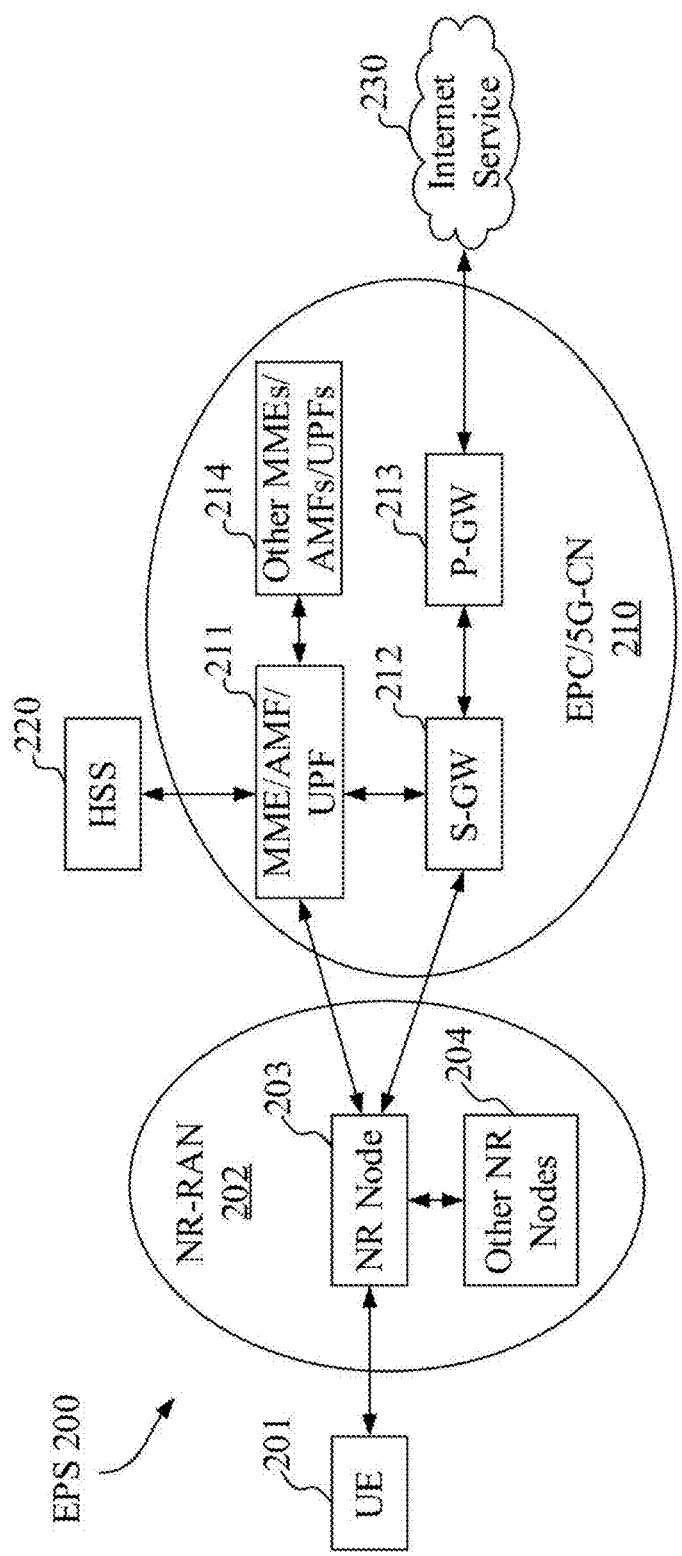
FIG. 2 is a diagram illustrating a network architecture according to one embodiment of the disclosure.

Embodiment 2 illustrates an example of a diagram of a network architecture, as shown in FIG. 2.

Embodiment 2 illustrates an example of a diagram of a network architecture according to the disclosure, as shown in FIG. 2. FIG. 2 is a diagram illustrating a network architecture 200 of NR 5G, LTE and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/ 5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 is connected to other gNBs 204 via an Xn interface (for example, backhaul). The gNB 203 and the gNB 204 may also be called base stations, base transceiver stations, radio base stations, radio transceivers, transceiver functions, Basic Service Sets (BSSs), Extended Service Sets (ESSs), TRPs or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), Satellite Radios, non-territorial network base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing signalings between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the disclosure.

In one subembodiment, the gNB 203 corresponds to the base station in the disclosure.

In one subembodiment, the UE 201 supports BF based transmissions.

In one subembodiment, the gNB 203 supports BF based transmissions.

Embodiment 3

Figure 3:
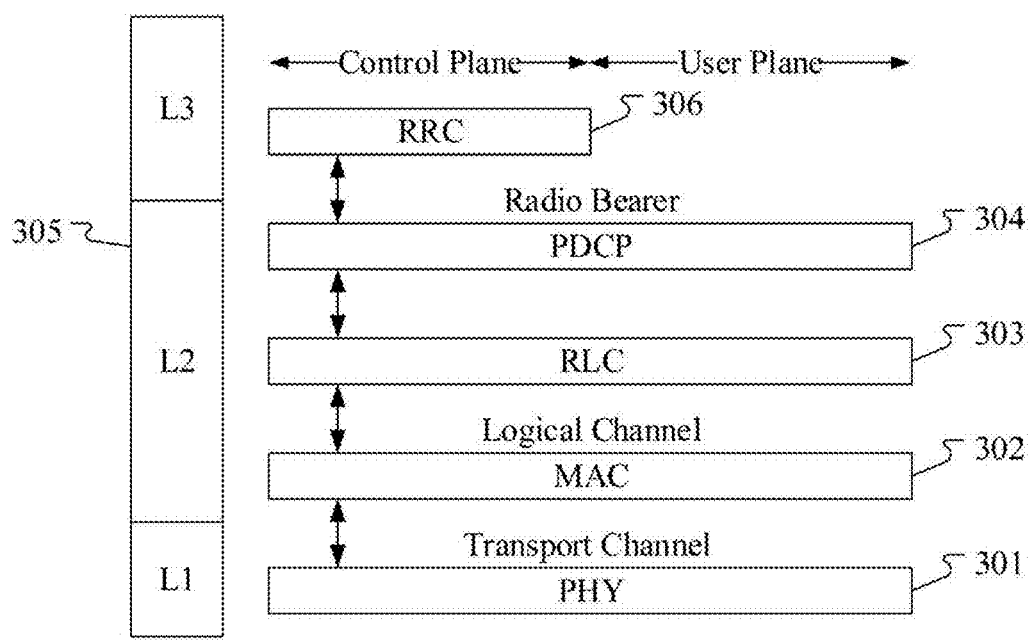
FIG. 3 is a diagram illustrating an embodiment of a radio protocol architecture of a user plane and a control plane according to one embodiment of the disclosure.

Embodiment 3 is a diagram illustrating an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is represented by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture shown in FIG. 3 is applicable to the UE in the disclosure.

In one subembodiment, the radio protocol architecture shown in FIG. 3 is applicable to the network equipment in the disclosure.

In one subembodiment, the first configuration information in the disclosure is generated by the RRC sublayer 306.

In one subembodiment, the first signaling in the disclosure is generated by the RRC sublayer 306.

In one subembodiment, the first signaling in the disclosure is generated by the PHY 301.

In one subembodiment, the second signaling in the disclosure is generated by the RRC sublayer 306.

In one subembodiment, the second signaling in the disclosure is generated by the PHY 301.

In one subembodiment, the first information in the disclosure is generated by the RRC sublayer 306.

Embodiment 4

Figure 4:
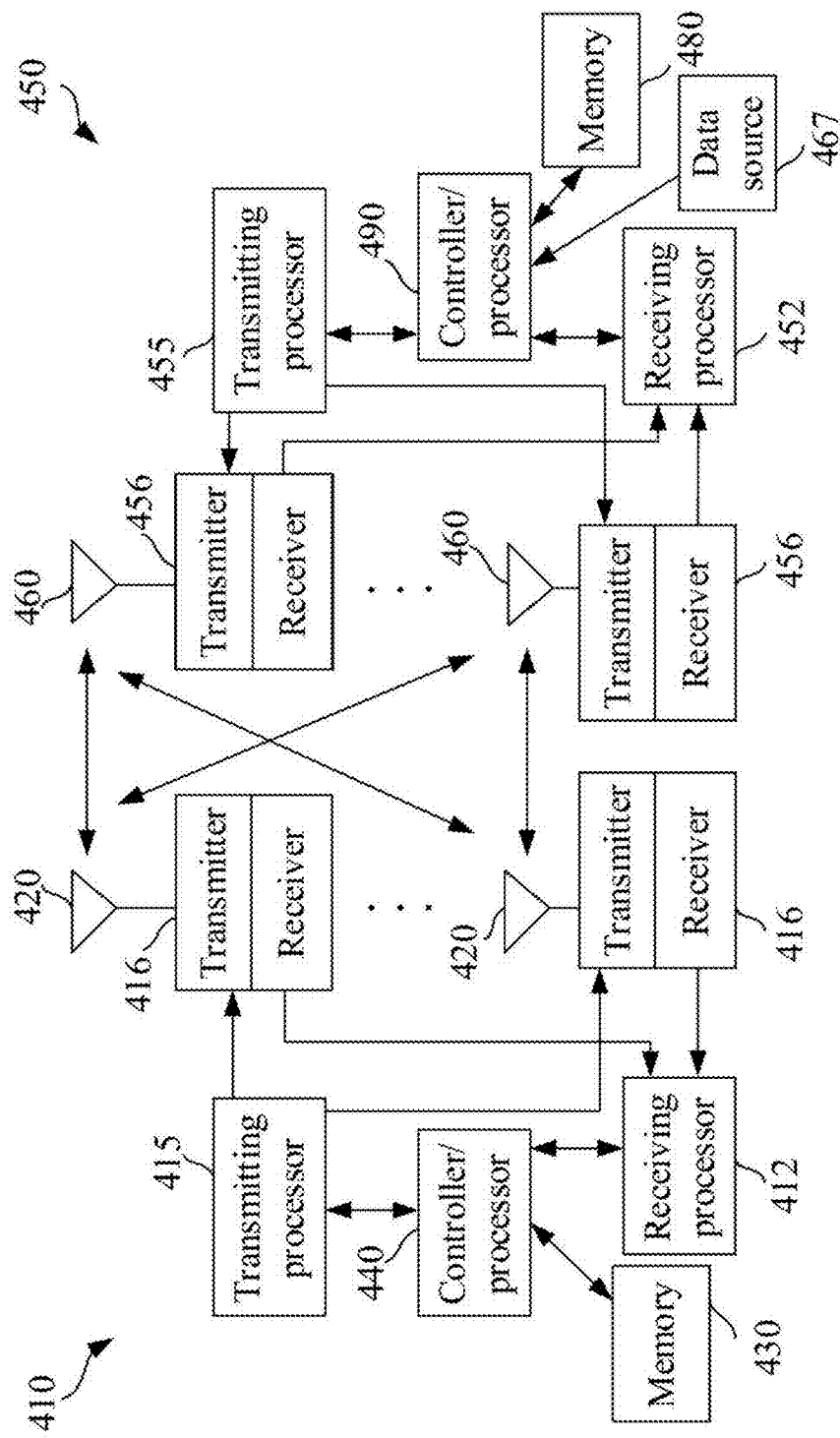
FIG. 4 is a diagram illustrating an evolved node B and a UE according to one embodiment of the disclosure.

Embodiment 4 illustrates a diagram of an evolved node B and a UE according to the disclosure, as shown in FIG. 4. The base station in the disclosure corresponds to the evolved node B. FIG. 4 is a block diagram of a gNB 410 in communication with a UE 450 in an access network.

The base station 410 includes a controller/processor 440, a memory 430, a receiving processor 412, a transmitting processor 415, a transmitter/receiver 416 and an antenna 420.

The UE 450 includes a controller/processor 490, a memory 480, a data source 467, a transmitting processor 455, a receiving processor 452, a transmitter/receiver 456 and an antenna 460.

In Downlink (DL) transmission, processes relevant to the base station 410 include the following.

A higher-layer packet is provided to the controller/processor 440. The controller/processor 440 provides header compression, encryption, packet segmentation and reordering, multiplexing and de-multiplexing between a logical channel and a transport channel, to implement L2 protocols used for the user plane and the control plane. The higher-layer packet may include data or control information, for example, Downlink Shared Channel (DL-SCH).

The controller/processor 440 is connected to the memory 430 that stores program codes and data. The memory 430 may be a computer readable medium.

The controller/processor 440 includes a scheduling unit used for transmission requirements. The scheduling unit is configured to schedule air-interface resources corresponding to transmission requirements.

The controller/processor 440 determines first configuration information, and determines to transmit a first radio signal and a second radio signal in first time domain resources and second time domain resources respectively, and sends the results to the transmitting processor 415.

The transmitting processor 415 receives a bit stream output from the controller/processor 440, and performs various signal transmitting processing functions used for L1 layer (that is, PHY), including encoding, interleaving, scrambling, modulation, power control/allocation, generation of physical layer control signalings (including PBCH, PDCCH, PHICH, PCFICH, reference signal), etc.

The transmitter 416 is configured to convert the baseband signal provided by the transmitting processor 415 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In DL transmission, processes relevant to the UE 450 include the following.

The receiver 456 is configured to convert a radio-frequency signal received via the antenna 460 into a baseband signal and provide the baseband signal to the receiving processor 452.

The receiving processor 452 performs various signal receiving processing functions used for L1 layer (that is, PHY), including decoding, de-interleaving, descrambling, demodulation, extraction of physical layer control signalings, etc.

The controller/processor 490 determines first configuration information, and determines to receive a first radio signal and a second radio signal in first time domain resources and second time domain resources respectively, and sends the results to the receiving processor 452.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The controller/processor 490 is connected to the memory 480 that stores program codes and data. The memory 480 may be a computer readable medium.

In one subembodiment, the UE 450 device includes at least one processor and at least one memory. The at least one memory includes computer program codes. The at least one memory and the computer program codes are configured to be used in collaboration with the at least one processor. The UE 450 device at least receives first configuration information, and receives a first radio signal and a second radio signal in first time domain resources and second time domain resources respectively; wherein a first bit block is used for generating the first radio signal and the second radio signal; the first configuration information is applied to the first radio signal and the second radio signal, and the first configuration information includes at least one of an MCS, a HARQ process number, an NDI or an RV; the first radio signal is transmitted by a first antenna port group, and the second radio signal is transmitted by a second antenna port group; the first antenna port group and the second antenna port group include P1 antenna port(s) and P2 antenna port(s) respectively; the P1 and the P2 are positive integers respectively; and at least one of the antenna ports belongs to one of the first antenna port group or the second antenna port group only.

In one subembodiment, the UE 450 includes a memory that stores a computer readable instruction program. The computer readable instruction program generates an action when executed by at least one processor. The action includes: receiving first configuration information, and receiving a first radio signal and a second radio signal in first time domain resources and second time domain resources respectively; wherein a first bit block is used for generating the first radio signal and the second radio signal; the first configuration information is applied to the first radio signal and the second radio signal, and the first configuration information includes at least one of an MCS, a HARQ process number, an NDI or an RV; the first radio signal is transmitted by a first antenna port group, and the second radio signal is transmitted by a second antenna port group; the first antenna port group and the second antenna port group include P1 antenna port(s) and P2 antenna port(s) respectively; the P1 and the P2 are positive integers respectively; and at least one of the antenna ports belongs to one of the first antenna port group or the second antenna port group only.

In one subembodiment, the gNB 410 includes at least one processor and at least one memory. The at least one memory includes computer program codes. The at least one memory and the computer program codes are configured to be used in collaboration with the at least one processor. The gNB 410 at least transmits first configuration information, and transmits a first radio signal and a second radio signal in first time domain resources and second time domain resources respectively; wherein a first bit block is used for generating the first radio signal and the second radio signal; the first configuration information is applied to the first radio signal and the second radio signal, and the first configuration information includes at least one of an MCS, a HARQ process number, an NDI or an RV; the first radio signal is transmitted by a first antenna port group, and the second radio signal is transmitted by a second antenna port group; the first antenna port group and the second antenna port group include P1 antenna port(s) and P2 antenna port(s) respectively; the P1 and the P2 are positive integers respectively; and at least one of the antenna ports belongs to one of the first antenna port group or the second antenna port group only.

In one subembodiment, the gNB 410 includes a memory that stores a computer readable instruction program. The computer readable instruction program generates an action when executed by at least one processor. The action includes: transmitting first configuration information, and transmitting a first radio signal and a second radio signal in first time domain resources and second time domain resources respectively; wherein a first bit block is used for generating the first radio signal and the second radio signal; the first configuration information is applied to the first radio signal and the second radio signal, and the first configuration information includes at least one of an MCS, a HARQ process number, an NDI or an RV; the first radio signal is transmitted by a first antenna port group, and the second radio signal is transmitted by a second antenna port group; the first antenna port group and the second antenna port group include P1 antenna port(s) and P2 antenna port(s) respectively; the P1 and the P2 are positive integers respectively; and at least one of the antenna ports belongs to one of the first antenna port group or the second antenna port group only.

In one subembodiment, the UE 450 corresponds to the UE in the disclosure.

In one subembodiment, the gNB 410 corresponds to the base station in the disclosure.

In one subembodiment, the controller/processor 490 is used for determining first configuration information, and is used for determining to receive a first radio signal and a second radio signal in first time domain resources and second time domain resources respectively.

In one subembodiment, at least one of the receiver 456 and the receiving processor 452 is used for receiving first configuration information, and receiving a first radio signal and a second radio signal in first time domain resources and second time domain resources respectively.

In one subembodiment, at least the former two of the receiver 456, the receiving processor 452 and the controller/processor 490 are used for receiving at least one of a first signaling or a second signaling.

In one subembodiment, at least the former two of the transmitter 456, the transmitting processor 455 and the controller/processor 490 are used for transmitting first information.

In one subembodiment, the controller/processor 440 is used for determining first configuration information, and is used for determining to transmit a first radio signal and a second radio signal in first time domain resources and second time domain resources respectively.

In one subembodiment, at least one of the transmitter 416 and the transmitting processor 415 is used for transmitting first configuration information, and transmitting a first radio signal and a second radio signal in first time domain resources and second time domain resources respectively.

In one subembodiment, at least the former two of the transmitter 416, the transmitting processor 415 and the controller/processor 440 are used for transmitting at least one of a first signaling or a second signaling.

In one subembodiment, at least the former two of the receiver 416, the receiving processor 412 and the controller/processor 440 are used for receiving first information.

Embodiment 5

Figure 5:
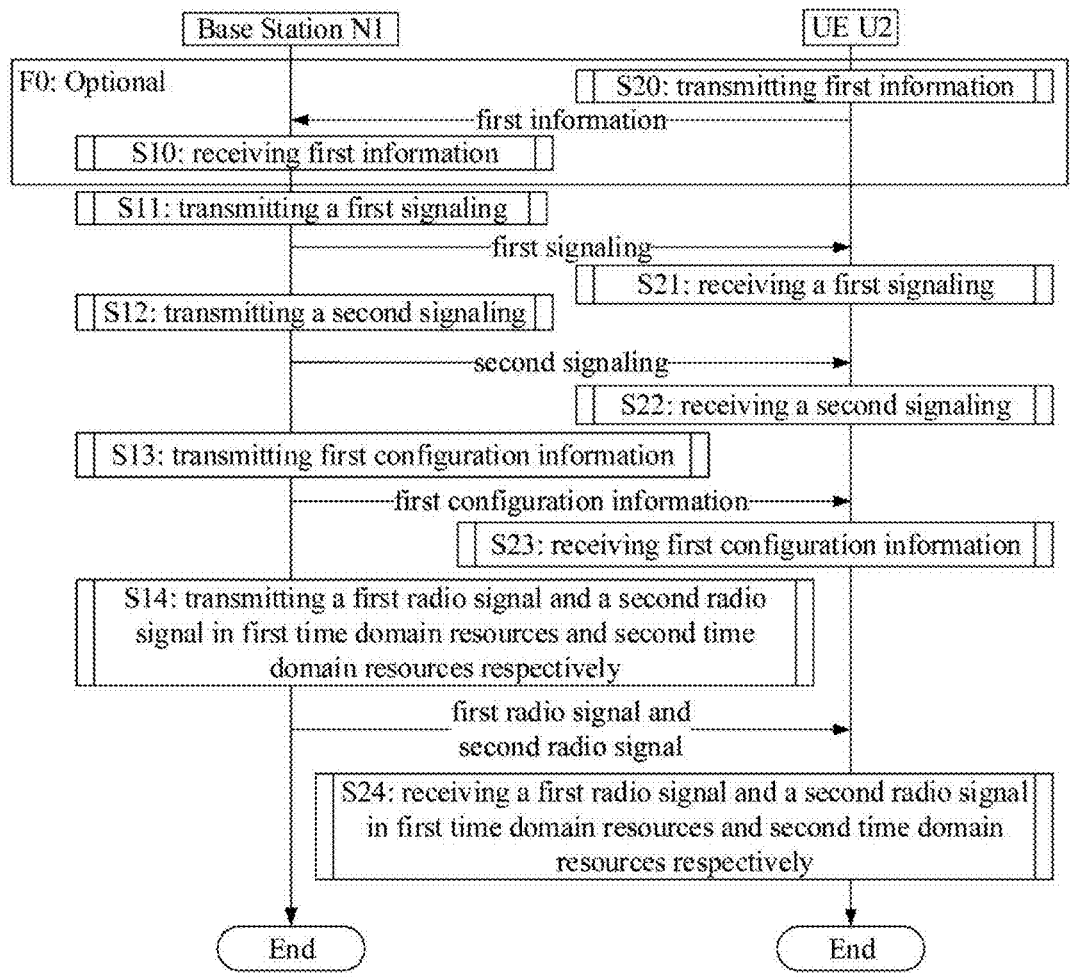
FIG. 5 is a flowchart illustrating the transmission of a first radio signal and a second radio signal according to one embodiment of the disclosure.

Embodiment 5 illustrates an example of a flowchart of the transmission of a first radio signal and a second radio signal according to the disclosure, as shown in FIG. 5. In FIG. 5, a base station N1 is a maintenance base station for a serving cell of a UE U2. Steps in box F0 are optional.

The base station N1 receives first information in S10, transmits a first signaling in S11, transmits a second signaling in S12, transmits first configuration information in S13, and transmits a first radio signal and a second radio signal in first time domain resources and second time domain resources respectively in S14.

The UE U2 transmits first information in S20, receives a first signaling in S21, receives a second signaling in S22, receives first configuration information in S23, and receives a first radio signal and a second radio signal in first time domain resources and second time domain resources respectively in S24.

In Embodiment 5, a first bit block is used for generating the first radio signal and the second radio signal; the first configuration information is applied to the first radio signal and the second radio signal, and the first configuration information includes at least one of an MCS, a HARQ process number, an NDI or an RV; the first radio signal is transmitted by a first antenna port group, and the second radio signal is transmitted by a second antenna port group; the first antenna port group and the second antenna port group include P1 antenna port(s) and P2 antenna port(s) respectively; the P1 and the P2 are positive integers respectively; at least one of the antenna ports belongs to one of the first antenna port group or the second antenna port group only; the first signaling is used for determining at least the former one of a first time domain resource pool or the first antenna port group; the second signaling is used for determining at least the former one of a first time window or the second antenna port group; the first time domain resources belong to an overlapped part of the first time domain resource pool and the first time window; the first information is used for determining P3 antenna port(s), the P3 antenna port(s) is(are) a subset of the P1 antenna port(s), and the P3 is a positive integer less than or equal to the P1.

In one subembodiment, the first radio signal includes P1 RS port(s), the P1 RS port(s) is(are) transmitted by the P1 antenna port(s) respectively, the second radio signal includes P2 RS port(s), and the P2 RS port(s) is(are) transmitted by the P2 antenna port(s) respectively.

In one subembodiment, the first radio signal includes P1 radio sub-signals, and the P1 radio sub-signals are transmitted by the P1 antenna ports respectively; the P1 radio sub-signals carry identical information, and any two of the P1 radio sub-signals occupy time domain resources which are orthogonal.

In one subembodiment, the first signaling is a physical-layer signaling, and the first signaling includes K1 information bits; the K1 is a positive integer greater than 1; and the K1 has a value related to a time domain position of the first time window In one subembodiment, the first signaling is a high-layer signaling, the second signaling is a physical-layer signaling, and the second signaling includes K2 information bits; the K2 is a positive integer greater than 1; and the K2 has a value related to a time domain position of the first time window.

In one subembodiment, the first signaling is an RRC signaling, and the second signaling is a physical-layer signaling.

In one affiliated embodiment of the above subembodiment, the second signaling is a DL grant.

In one subembodiment, the first signaling and the second signaling are both DL grants.

In one subembodiment, a transmission channel corresponding to the first radio signal is a Downlink Shared Channel (DL-SCH).

In one subembodiment, a transmission channel corresponding to the second radio signal is a DL-SCH.

In one subembodiment, the first radio signal is transmitted on a Physical Downlink Shared Channel (PDSCH).

In one subembodiment, the first radio signal is transmitted on a sPDSCH.

In one subembodiment, the second radio signal is transmitted on a PDSCH.

In one subembodiment, the second radio signal is transmitted on a sPDSCH.

Embodiment 6

Figure 6:
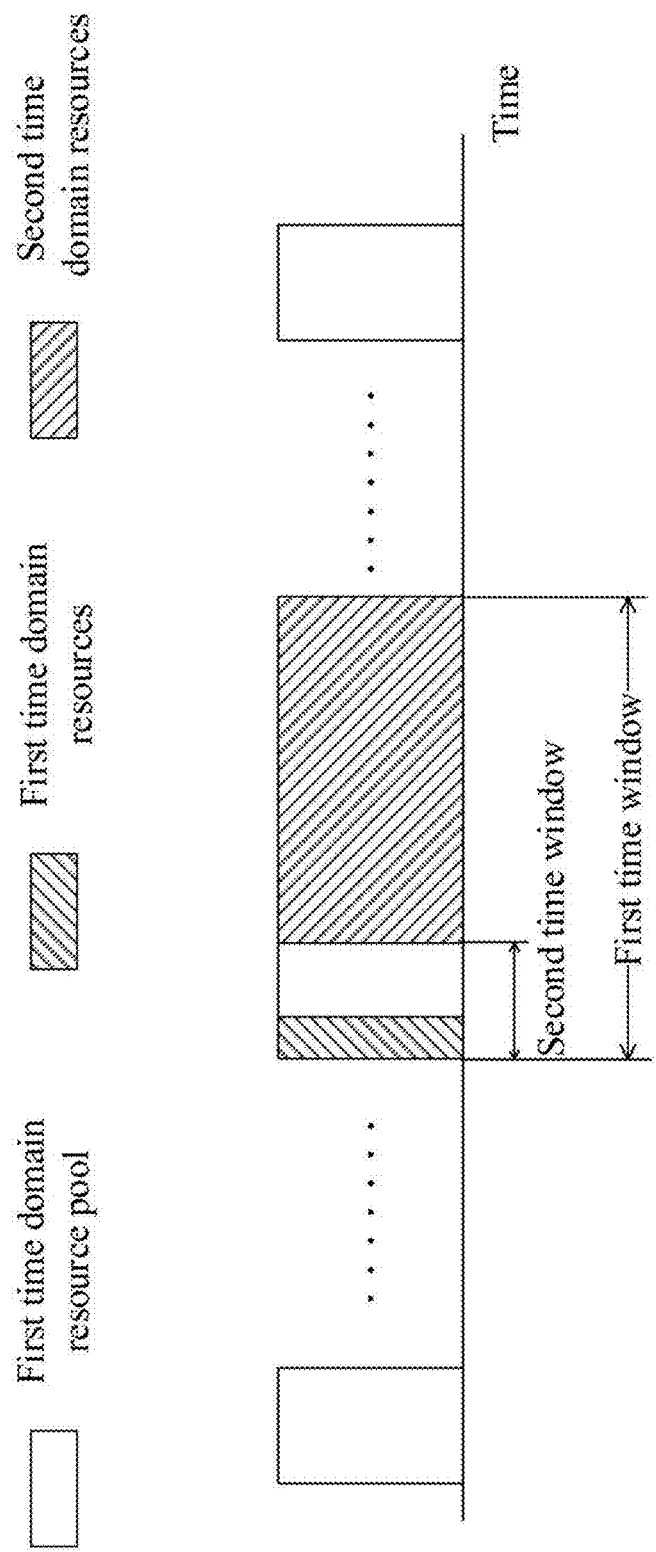
FIG. 6 is a diagram illustrating a first time window according to one embodiment of the disclosure.

Embodiment 6 illustrates an example of a diagram of a first time window. As shown in FIG. 6, the bold-line box corresponds to time domain resources occupied by a second time window. The second time window is an overlapped part of the first time domain resource pool and the first time window in time domain. The first time domain resources shown in FIG. 6 occupy partial time domain resources of the second time window.

In one subembodiment, the first time domain resource pool is configurable.

In one subembodiment, the first time domain resource pool is periodically distributed in time domain.

In one subembodiment, the duration of the first time window is not greater than 1 ms in time domain.

In one subembodiment, positions of the first time domain resources in the second time window are indicated by one of a first signaling or a second signaling. At least one of the first signaling and the second signaling is a physical layer signaling.

In one subembodiment, whether the second time window includes the first time domain resources is indicated by one of a first signaling or a second signaling. At least one of the first signaling and the second signaling is a physical layer signaling.

In one subembodiment, a first radio signal is transmitted by a first antenna port group on the first time domain resources, and a second radio signal is transmitted by a second antenna port group on the second time domain resources. The first antenna port group and the second antenna port group include P1 antenna port(s) and P2 antenna port(s) respectively. The P1 and the P2 are positive integers respectively. The P1 antenna port(s) belong(s) to the P2 antenna port(s).

Embodiment 7

Figure 7:
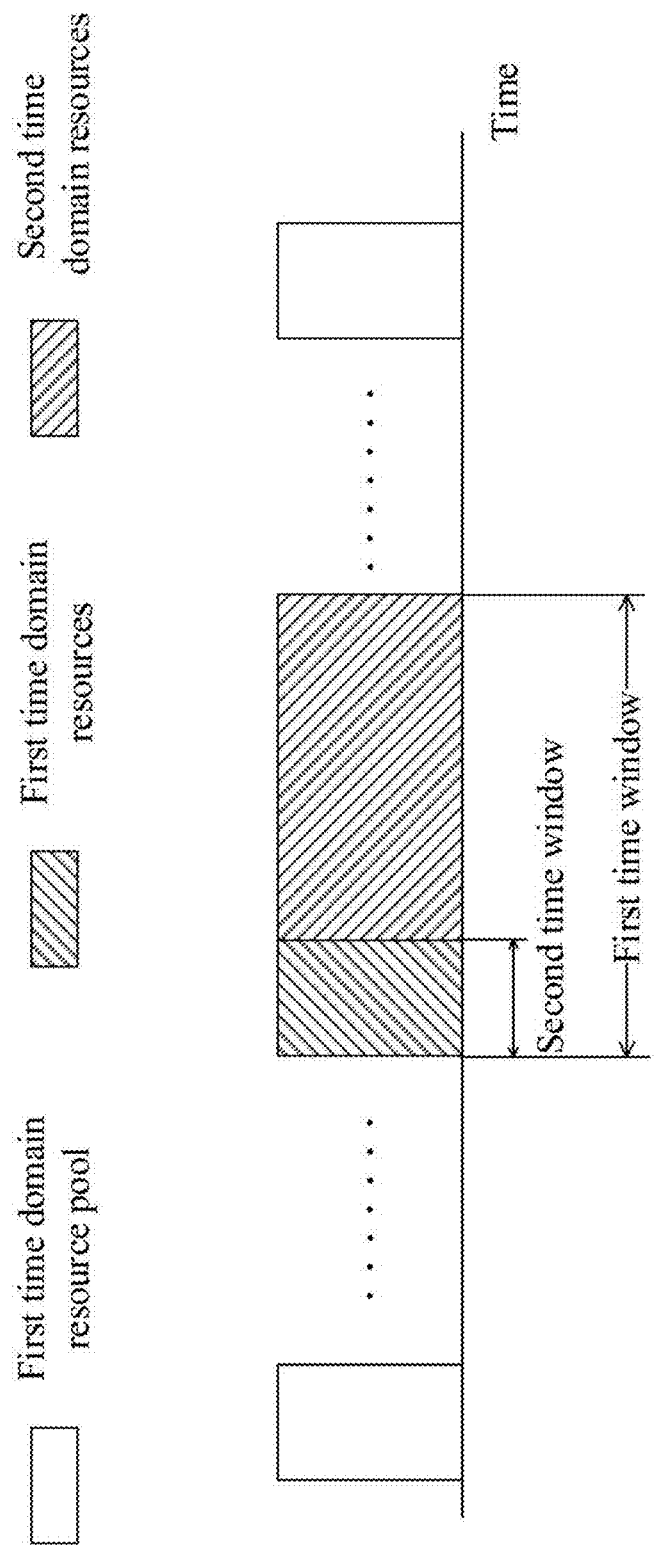
FIG. 7 is a diagram illustrating a first time window according to another embodiment of the disclosure.

Embodiment 7 illustrates an example of a diagram of another first time window. As shown in FIG. 7, the bold-line box corresponds to time domain resources occupied by a second time window. The second time window is an overlapped part of the first time domain resource pool and the first time window in time domain. The first time domain resources shown in FIG. 7 occupy all time domain resources of the second time window.

In one subembodiment, the first time domain resource pool is configurable.

In one subembodiment, the first time domain resource pool is periodically distributed in time domain.

In one subembodiment, the duration of the first time window is not greater than 1 ms in time domain.

In one subembodiment, whether the second time window includes the first time domain resources is indicated by one of a first signaling or a second signaling. At least one of the first signaling and the second signaling is a physical layer signaling.

Embodiment 8

Figure 8:
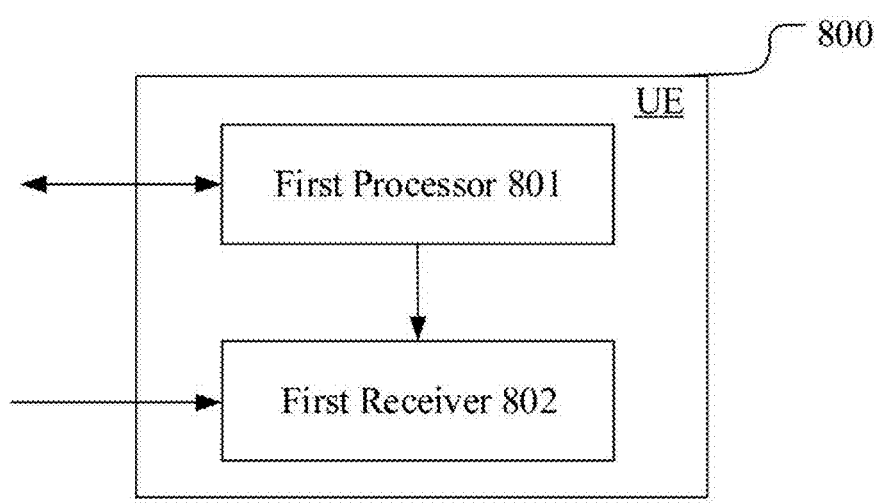
FIG. 8 is a structure block diagram illustrating a processing device in a UE according to one embodiment of the disclosure.

Embodiment 8 illustrates a structure block diagram of a processing device in a UE, as shown in FIG. 8. In FIG. 8, the processing device 800 in the UE is mainly composed of a first processor 801 and a first receiver 802.

The first processor 801 receives first configuration information.

The first receiver 802 receives a first radio signal and a second radio signal in first time domain resources and second time domain resources respectively.

In Embodiment 8, a first bit block is used for generating the first radio signal and the second radio signal; the first configuration information is applied to the first radio signal and the second radio signal, and the first configuration information includes an MCS, a HARQ process number, an NDI or an RV; the first radio signal is transmitted by a first antenna port group, and the second radio signal is transmitted by a second antenna port group; the first antenna port group and the second antenna port group include P1 antenna port(s) and P2 antenna port(s) respectively; the P1 and the P2 are positive integers respectively; the antenna ports in the first antenna port group and the antenna ports in the second antenna port group are not entirely identical.

In one embodiment, the first processor 801 further receives a first signaling and a second signaling; the first signaling is used for determining at least the former one of a first time domain resource pool or the first antenna port group; the second signaling is used for determining at least the former one of a first time window or the second antenna port group; and the first time domain resources belong to an overlapped part of the first time domain resource pool and the first time window.

In one embodiment, the first processor 801 further transmits first information; the first information is used for determining P3 antenna port(s), the P3 antenna port(s) is(are) a subset of the P1 antenna port(s), and the P3 is a positive integer less than or equal to the P1.

In one embodiment, the first processor 801 includes {the receiver/transmitter 456, the receiving processor 452, the transmitting processor 455, the controller/processor 490} mentioned in Embodiment 4.

In one embodiment, the first receiver 802 includes at least the former two of {the receiver 456, the receiving processor 452, the controller/processor 490} mentioned in Embodiment 4.

Embodiment 9

Figure 9:
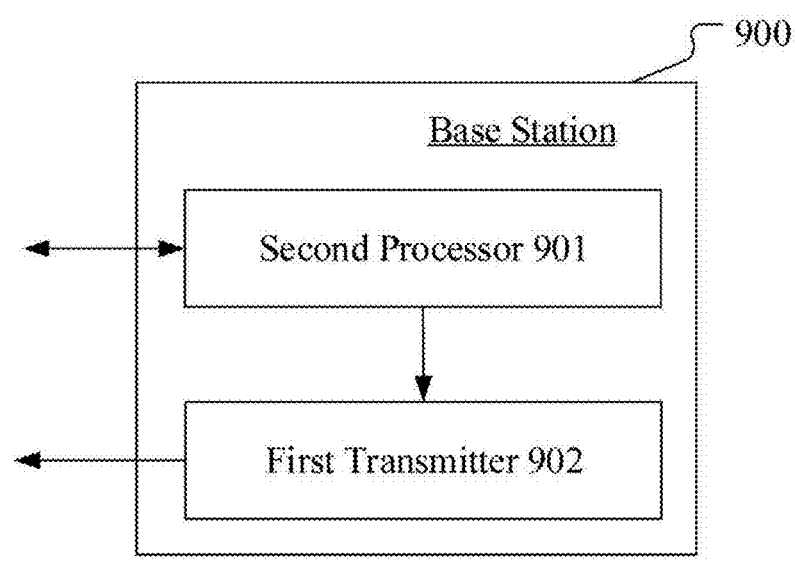
FIG. 9 is a structure block diagram illustrating a processing device in a base station according to one embodiment of the disclosure.

Embodiment 9 illustrates an example of a structure block diagram of a processing device in a base station, as shown in FIG. 9. In FIG. 9, the processing device 900 in the base station is mainly composed of a second processor 901 and a first transmitter 902.

The second processor 901 transmits first configuration information.

The first transmitter 902 transmits a first radio signal and a second radio signal in first time domain resources and second time domain resources respectively.

In Embodiment 9, a first bit block is used for generating the first radio signal and the second radio signal; the first configuration information is applied to the first radio signal and the second radio signal, and the first configuration information includes an MCS, a HARQ process number, an NDI or an RV; the first radio signal is transmitted by a first antenna port group, and the second radio signal is transmitted by a second antenna port group; the first antenna port group and the second antenna port group include P1 antenna port(s) and P2 antenna port(s) respectively; the P1 and the P2 are positive integers respectively; and at least one of the antenna ports belongs to one of the first antenna port group or the second antenna port group only.

In one embodiment, the second processor 901 further transmits a first signaling and a second signaling; the first signaling is used for determining at least the former one of a first time domain resource pool or the first antenna port group; the second signaling is used for determining at least the former one of a first time window or the second antenna port group; and the first time domain resources belong to an overlapped part of the first time domain resource pool and the first time window.

In one embodiment, the second processor 901 further receives first information; the first information is used for determining P3 antenna port(s), the P3 antenna port(s) is(are) a subset of the P1 antenna port(s), and the P3 is a positive integer less than or equal to the P1.

In one embodiment, the second processor 901 includes at least the former three of {the transmitter/receiver 416, the transmitting processor 415, the receiving processor 412, the controller/processor 440} mentioned in Embodiment 4.

In one embodiment, the first transmitter 902 includes at least the former two of {the transmitter 416, the transmitting processor 415, the controller/processor 440} mentioned in Embodiment 4.

Embodiment 10

Figure 10:
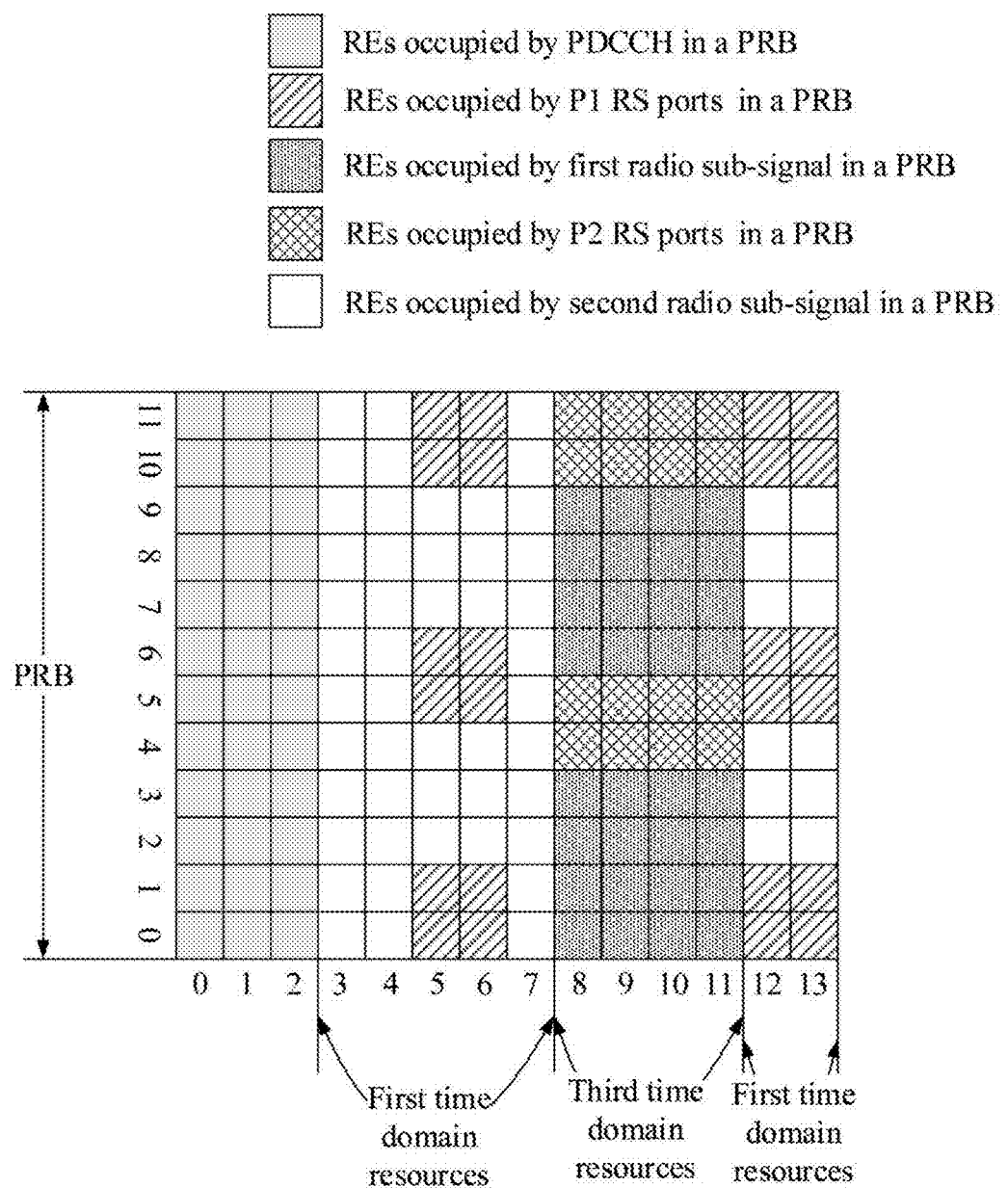
FIG. 10 is a diagram illustrating resource allocation in a Physical Resource Block (PRB) according to one embodiment of the disclosure.

Embodiment 10 illustrates an example of a diagram of resource allocation in a PRB, as shown in FIG. 10. In FIG. 10, grey grids represent Resource Elements (REs) allocated to a Physical Downlink Control Channel (PDCCH), grids filled with dots represent REs occupied by a first radio sub-signal in a PRB, blank grids represent REs occupied by a second radio sub-signal in a PRB, grids filled with slashes represent REs occupied by the P1 RS ports in the disclosure in a PRB, and grids filled with cross lines represent REs occupied by the P2 RS ports in the disclosure in a PRB. The first radio sub-signal and the P1 RS ports constitute a first radio signal in the disclosure. The second radio sub-signal and the P2 RS ports constitute a second radio signal in the disclosure.

In Embodiment 10, the first time resources in the disclosure include OFDM symbols {3, 4, 5, 6, 7, 12, 13}. The third time resources include {8, 9, 10, 11}.

In Subembodiment 1, the first time resources in the disclosure are the third time resources.

In Subembodiment 2, the first time resources in the disclosure are a subset of the third time resources, and are indicated by the second signaling in the disclosure.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other wireless communication equipment. The base station in the disclosure includes but not limited to macro-cellular base stations, micro-cellular base stations, home base stations, relay base stations, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for dynamic scheduling, comprising:
   receiving first configuration information; and
   receiving a first radio signal and a second radio signal in first time domain resources and second time domain resources respectively;
   wherein a first bit block is used for generating the first radio signal and the second radio signal; the first configuration information is applied to the first radio signal and the second radio signal, and the first configuration information includes at least one of a Modulation and Coding Status (MCS), a Hybrid Automatic Repeat request (HARQ) process number, a New Data Indicator (NDI) or a Redundancy Version (RV); the first radio signal is transmitted by a first antenna port group, and the second radio signal is transmitted by a second antenna port group; the first antenna port group and the second antenna port group comprise P1 antenna port(s) and P2 antenna port(s) respectively; the P1 and the P2 are positive integers respectively; and at least one of the antenna ports belongs to one of the first antenna port group or the second antenna port group only.

2. The method according to claim 1, comprising:
   receiving a first signaling; and
   receiving a second signaling;
   wherein the first signaling is used for determining at least the former one of a first time domain resource pool or the first antenna port group; the second signaling is used for determining at least the former one of a first time window or the second antenna port group; and the first time domain resources belong to an overlapped part of the first time domain resource pool and the first time window.

3. The method according to claim 1, wherein the first radio signal comprises P1 RS port(s), and the P1 RS port(s) is(are) transmitted by the P1 antenna port(s) respectively; and the second radio signal comprises P2 RS port(s), and the P2 RS port(s) is(are) transmitted by the P2 antenna port(s) respectively.

4. The method according to claim 1, comprising:
   transmitting first information;
   wherein the first information is used for determining P3 antenna port(s), the P3 antenna port(s) is(are) a subset of the P1 antenna port(s), and the P3 is a positive integer less than or equal to the P1.

5. The method according to claim 1, wherein the first radio signal comprises P1 radio sub-signals, the P1 radio sub-signals are transmitted by the P1 antenna ports respectively, the P1 radio sub-signals carry identical information, and any two of the P1 radio sub-signals occupy time domain resources which are orthogonal; or, the first signaling is a physical-layer signaling, the first signaling comprises K1 information bits, the K1 is a positive integer greater than 1, and the K1 has a value related to a time domain position of the first time window; or, the first signaling is a high-layer signaling, the second signaling is a physical-layer signaling, the second signaling comprises K2 information bits, the K2 is a positive integer greater than 1, and the K2 has a value related to a time domain position of the first time window.

6. The method according to claim 1, wherein the P1 is different from the P2; or, the first radio signal and the second radio signal belong to one time of transmission of the first bit block.

7. A method in a base station for dynamic scheduling, comprising:
   transmitting first configuration information; and
   transmitting a first radio signal and a second radio signal in first time domain resources and second time domain resources respectively;
   wherein a first bit block is used for generating the first radio signal and the second radio signal; the first configuration information is applied to the first radio signal and the second radio signal, and the first configuration information includes at least one of an MCS, a HARQ process number, an NDI or an RV; the first radio signal is transmitted by a first antenna port group, and the second radio signal is transmitted by a second antenna port group; the first antenna port group and the second antenna port group comprise P1 antenna port(s) and P2 antenna port(s) respectively; the P1 and the P2 are positive integers respectively; and at least one of the antenna ports belongs to one of the first antenna port group or the second antenna port group only.

8. The method according to claim 7, comprising:
   transmitting a first signaling; and
   transmitting a second signaling;
   wherein the first signaling is used for determining at least the former one of a first time domain resource pool or the first antenna port group; the second signaling is used for determining at least the former one of a first time window or the second antenna port group; and the first time domain resources belong to an overlapped part of the first time domain resource pool and the first time window.

9. The method according to claim 7, comprising:
   receiving first information;
   wherein the first information is used for determining P3 antenna port(s), the P3 antenna port(s) is(are) a subset of the P1 antenna port(s), and the P3 is a positive integer less than or equal to the P1.

10. The method according to claim 7, wherein the first radio signal comprises P1 RS ports, the P1 RS ports are transmitted by the P1 antenna ports respectively, the second radio signal comprises P2 RS ports, and the P2 RS ports are transmitted by the P2 antenna ports respectively; or, the first radio signal comprises P1 radio sub-signals, the P1 radio sub-signals are transmitted by the P1 antenna ports respectively, the P1 radio sub-signals carry identical information, and any two of the P1 radio sub-signals occupy time domain resources which are orthogonal, or, the first signaling is a physical-layer signaling, and the first signaling comprises K1 information bits; the K1 is a positive integer greater than 1, and the K1 has a value related to a time domain position of the first time window; or, the first signaling is a high-layer signaling, the second signaling is a physical-layer signaling, and the second signaling comprises K2 information bits; the K2 is a positive integer greater than 1; and the K2 has a value related to a time domain position of the first time window.

11. A UE for dynamic scheduling, comprising:
a first processor, to receive first configuration information; and
a first receiver, to receive a first radio signal and a second radio signal in first time domain resources and second time domain resources respectively;
wherein a first bit block is used for generating the first radio signal and the second radio signal; the first configuration information is applied to the first radio signal and the second radio signal, and the first configuration information includes at least one of an MCS, a HARQ process number, an NDI or an RV; the first radio signal is transmitted by a first antenna port group, and the second radio signal is transmitted by a second antenna port group; the first antenna port group and the second antenna port group comprise P1 antenna port(s) and P2 antenna port(s) respectively; the P1 and the P2 are positive integers respectively; and at least one of the antenna ports belongs to one of the first antenna port group or the second antenna port group only.

12. The UE according to claim 11, wherein the first processor receives a first signaling and a second signaling;
wherein the first signaling is used for determining at least the former one of a first time domain resource pool or the first antenna port group; the second signaling is used for determining at least the former one of a first time window or the second antenna port group; and the first time domain resources belong to an overlapped part of the first time domain resource pool and the first time window.

13. The UE according to claim 11, wherein the first radio signal comprises P1 RS port(s), and the P1 RS port(s) is(are) transmitted by the P1 antenna port(s) respectively; and the second radio signal comprises P2 RS port(s), and the P2 RS port(s) is(are) transmitted by the P2 antenna port(s) respectively.

14. The UE according to claim 11, wherein the first processor transmits first information;
wherein the first information is used for determining P3 antenna port(s), the P3 antenna port(s) is(are) a subset of the P1 antenna port(s), and the P3 is a positive integer less than or equal to the P1.

15. The UE according to claim 11, wherein the first radio signal comprises P1 radio sub-signals, the P1 radio sub-signals are transmitted by the P1 antenna ports respectively, the P1 radio sub-signals carry identical information, and any two of the P1 radio sub-signals occupy time domain resources which are orthogonal; or, the first signaling is a physical-layer signaling, the first signaling comprises K1 information bits, the K1 is a positive integer greater than 1, and the K1 has a value related to a time domain position of the first time window; or, the first signaling is a high-layer signaling, the second signaling is a physical-layer signaling, the second signaling comprises K2 information bits, the K2 is a positive integer greater than 1, and the K2 has a value related to a time domain position of the first time window.

16. The UE according to claim 11, wherein the P1 is different from the P2; or, the first radio signal and the second radio signal belong to one time of transmission of the first bit block.

17. A base station for dynamic scheduling, comprising:
a second processor, to transmit first configuration information; and
a first transmitter, to transmit a first radio signal and a second radio signal in first time domain resources and second time domain resources respectively;
wherein a first bit block is used for generating the first radio signal and the second radio signal; the first configuration information is applied to the first radio signal and the second radio signal, and the first configuration information includes at least one of an MCS, a HARQ process number, an NDI or an RV; the first radio signal is transmitted by a first antenna port group, and the second radio signal is transmitted by a second antenna port group; the first antenna port group and the second antenna port group comprise P1 antenna port(s) and P2 antenna port(s) respectively; the P1 and the P2 are positive integers respectively; and at least one of the antenna ports belongs to one of the first antenna port group or the second antenna port group only.

18. The base station according to claim 17, wherein the second processor transmits a first signaling and a second signaling; wherein the first signaling is used for determining at least the former one of a first time domain resource pool or the first antenna port group; the second signaling is used for determining at least the former one of a first time window or the second antenna port group; and the first time domain resources belong to an overlapped part of the first time domain resource pool and the first time window.

19. The base station according to claim 17, wherein the second processor receives first information; wherein the first information is used for determining P3 antenna port(s), the P3 antenna port(s) is(are) a subset of the P1 antenna port(s), and the P3 is a positive integer less than or equal to the P1.

20. The base station according to claim 17, wherein the first radio signal comprises P1 RS ports, the P1 RS ports are transmitted by the P1 antenna ports respectively, the second radio signal comprises P2 RS ports, and the P2 RS ports are transmitted by the P2 antenna ports respectively; or, the first radio signal comprises P1 radio sub-signals, the P1 radio sub-signals are transmitted by the P1 antenna ports respectively, the P1 radio sub-signals carry identical information, and any two of the P1 radio sub-signals occupy time domain resources which are orthogonal, or, the first signaling is a physical-layer signaling, and the first signaling comprises K1 information bits; the K1 is a positive integer greater than 1, and the K1 has a value related to a time domain position of the first time window; or, the first signaling is a high-layer signaling, the second signaling is a physical-layer signaling, and the second signaling comprises K2 information bits; the K2 is a positive integer greater than 1; and the K2 has a value related to a time domain position of the first time window.

* * * * *